United States Patent
Provenziani

(10) Patent No.: US 10,046,258 B2
(45) Date of Patent: Aug. 14, 2018

(54) DEVICE FOR LOCKING A FILTER IN A CONDUIT

(71) Applicant: PROVIDES METALMECCANICA S.R.L., Latina (IT) (IT)

(72) Inventor: Franco Provenziani, Latina (IT)

(73) Assignee: PROVIDES METALMECCANICA S.R.L., Latina (IT)

(*) Notice: Subject to any disclaimer, the term of this patent is extended or adjusted under 35 U.S.C. 154(b) by 509 days.

(21) Appl. No.: 14/442,374

(22) PCT Filed: Nov. 13, 2013

(86) PCT No.: PCT/IB2013/060095
§ 371 (c)(1),
(2) Date: May 12, 2015

(87) PCT Pub. No.: WO2014/080317
PCT Pub. Date: May 30, 2014

(65) Prior Publication Data
US 2016/0184749 A1    Jun. 30, 2016

(30) Foreign Application Priority Data
Nov. 21, 2012  (IT) .............................. RM2012A0580

(51) Int. Cl.
*B01D 35/30*   (2006.01)
*B01D 35/02*   (2006.01)

(52) U.S. Cl.
CPC ........... *B01D 35/306* (2013.01); *B01D 35/02* (2013.01); *B01D 2201/02* (2013.01)

(58) Field of Classification Search
CPC ..... B01D 35/02; B01D 35/306; B01D 2201/02
See application file for complete search history.

(56) References Cited

U.S. PATENT DOCUMENTS

2005/0122416 A1* 6/2005 Ryu .................. H04N 5/23203
                                                    348/333.07
2011/0114195 A1  5/2011 Haas et al.

FOREIGN PATENT DOCUMENTS

FR    2897784    8/2007
GB     126586    5/1919

OTHER PUBLICATIONS

PCT International Search Report dated Jun. 4, 2014 for PCT/IB2013/060095 filed on Nov. 13, 2013 in the name of Provides Metalmeccanica S.R.L.

(Continued)

*Primary Examiner* — Robert Clemente
(74) *Attorney, Agent, or Firm* — Steinfl + Bruno, LLP

(57) ABSTRACT

A device for locking a filter in a conduit for use in heat exchangers is described. The device includes: a main body apt to be associated with the filter and made in two parts, and three locking arms, which branch off from the main body and have each a first longitudinal end which can be tightened within the main body and a second longitudinal end which abuts on the conduit to block the filter. The locking arms are movable with respect to the main body so as to assume a first configuration of minimal encumbrance, in which the insertion of the device in the conduit is allowed, and a second locking configuration, in which the second longitudinal ends are abutted on the walls of the duct. The device allows a removable locking of the filter in the conduit.

16 Claims, 4 Drawing Sheets

(56) References Cited

OTHER PUBLICATIONS

PCT Written Opinion dated Jun. 4, 2014 for PCT/IB2013/060095 filed on Nov. 13, 2013 in the name of Provides Metalmeccanica S.R.L.
International Preliminary Report on Patentability dated May 26, 2015 for PCT/IB2013/060095 (filed on Nov. 13, 2013), 5 pages.

* cited by examiner

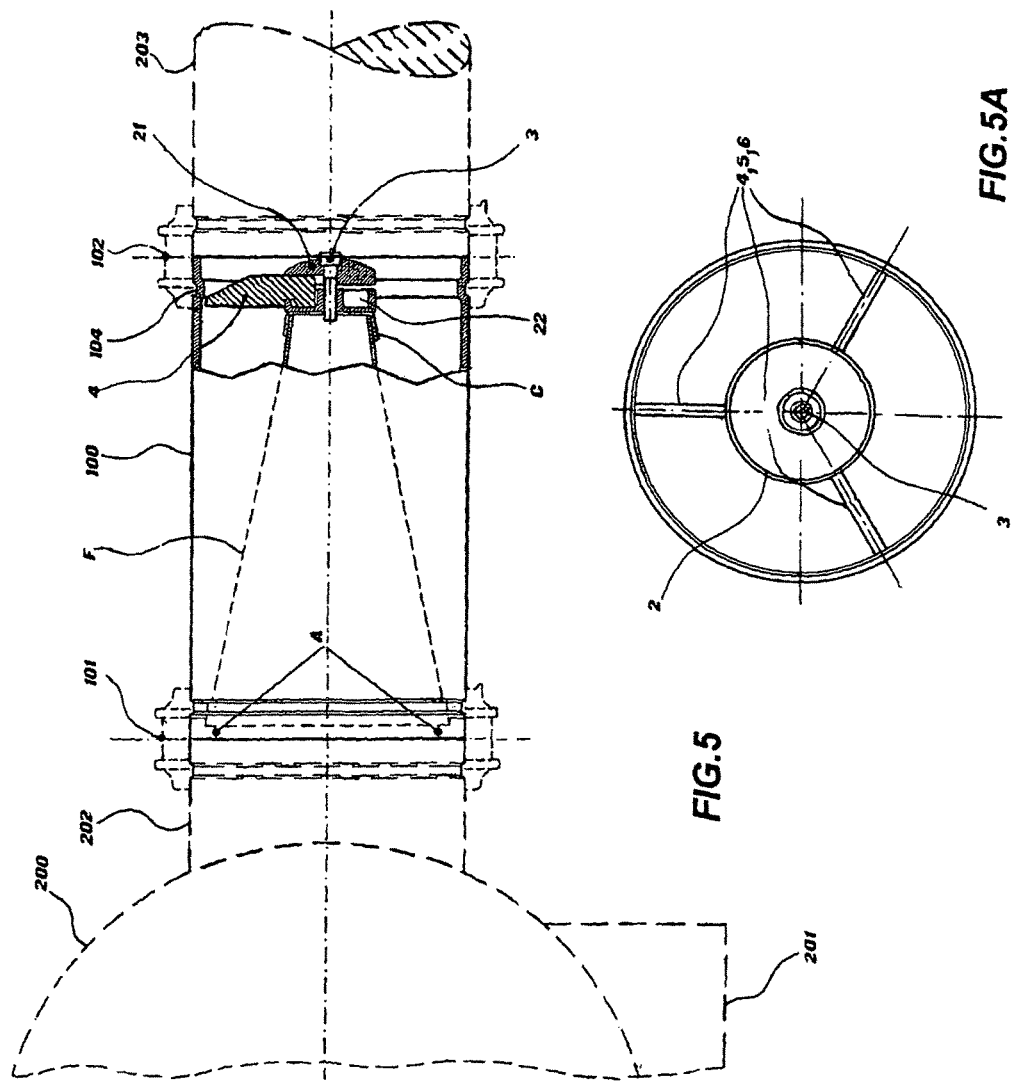

DEVICE FOR LOCKING A FILTER IN A CONDUIT

CROSS REFERENCE TO RELATED APPLICATIONS

The present application is the US national stage of International Patent Application PCT/IB2013/060095 filed on Nov. 13, 2013 which, in turn, claims priority to Italian application RM2012A000580 filed on Nov. 21, 2012.

TECHNICAL FIELD OF THE INVENTION

The present invention relates to a locking device of a filter in a conduit, particularly suitable for use, for example, in heat exchangers, for example for industrial plants conditioning.

BACKGROUND

In the conduits associated with heat exchangers, particularly those installed in industrial plants conditioning, filters are used targeted to avoid that any impurities present in the operating fluid reaching the sensitive components of the heat exchanger (for example, the tube bundle, the plates, and so on). In such plants, the filters are placed by various methods/mechanisms.

The installation and removal of the filter, as well as maintenance in general, are rather complex and require a block of the plant or of part of it. The same drawbacks are felt also in other technical fields providing the use of a filter in any pipe.

SUMMARY OF THE INVENTION

The technical problem posed and solved by the present invention is then to provide a locking device of a filter in a conduit allowing to obviate the drawbacks mentioned above by referring to the known prior art.

Such problem is solved by a device for locking a filter in a conduit, in particular for use in a heat exchanger, the device having: a main body made of two parts and adapted to be associated with the filter; and a plurality of locking arms, which, in use, branch off from the main body and have each a first longitudinal end coupled with the main body and a second longitudinal end adapted to abut on the conduit for locking the filter. The locking arms are movable with respect to the main body so as to assume a first minimal encumbrance configuration, in which insertion of the device in the conduit is allowed, and a second locking configuration in which the two parts are mutually tightened, the one on the other, and hold therebetween the first longitudinal end and in which the second longitudinal end abut on the walls of the conduit, the device allowing a removable locking of the filter in the conduit.

Preferred features of the present invention are subject of the depending claims.

The locking device of the invention, by virtue of the dual configuration that can be taken by their side arms, allows a quick and easy insertion of the device and the filter in the conduit and its easy removal and/or maintenance. Moreover, the filter can be locked in a removable manner, i.e. reversible, in the conduit.

Therefore, the installation operation are drastically simplified, removal and maintenance of the filter in general, with a drastic reduction of the impact of these operations on the operation of the plant.

Other advantages, features and application modes of the present invention will result to be evident from the following detailed description of some embodiments, shown by way of example and not for limitative purposes.

BRIEF DESCRIPTION OF THE FIGURES

Reference will be made to the figures of the accompanying drawings, in which:

FIG. 5 shows a cross-sectional view of the device of FIG. 1 installed in a duct; and FIG. 5A shows a front view of the device of FIG. 5.

DETAILED DESCRIPTION OF PREFERRED EMBODIMENT

Figure 1A:
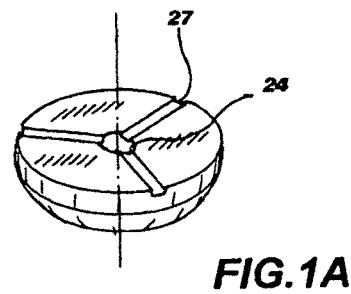
FIG. 1A shows an additional view of a cover portion of the device of FIG. 1.
Figure 1:
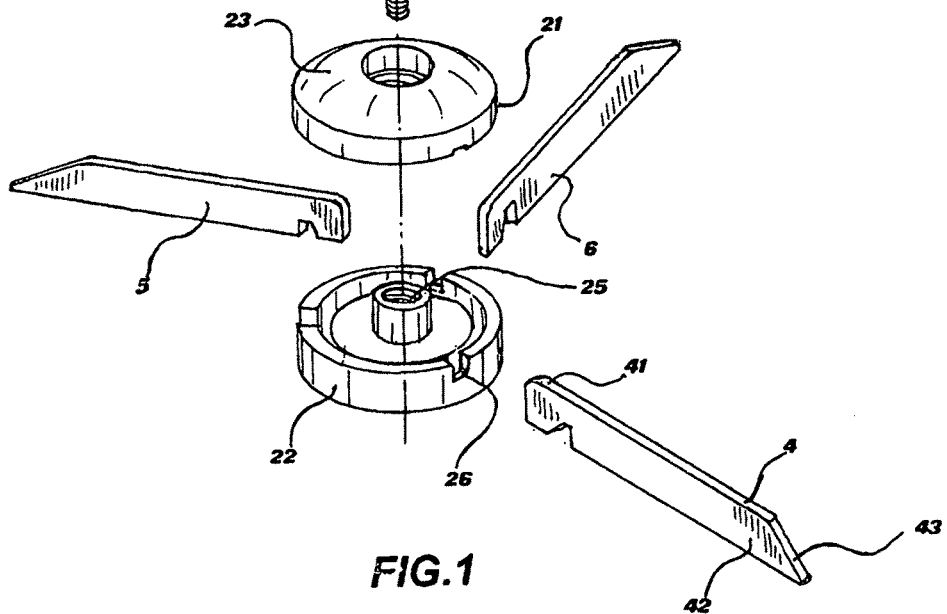
FIG. 1 shows an exploded view of a preferred embodiment of the heat exchanger according to the present invention.
Figure 2:
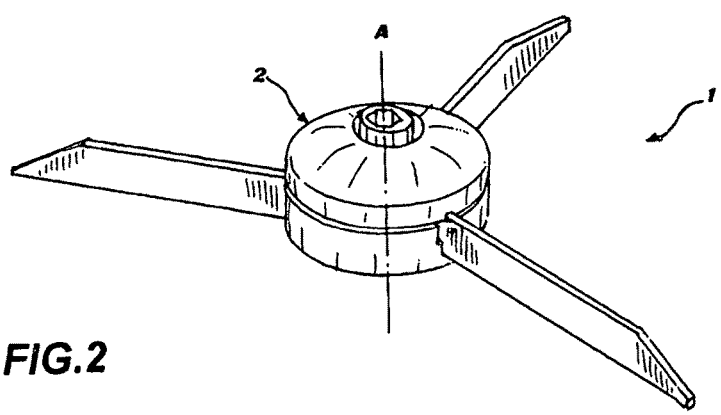
FIG. 2 shows a perspective view of the device of FIG. 1 in the assembled configuration of locking.

With reference initially to FIGS. 1, 1A and 2, a locking device of a filter in a conduit according to a preferred embodiment of the invention is overall denoted by 1.

The locking device 1 comprises a main body 2 apt to be associated, in particular fixed, supported or differently connected, to a filter in a manner which will be explained below. In use, the main body 2 is arranged in a centered position relative to the cross section of the conduit in which it is installed.

The main body 2 has a substantially circular geometry, in particular substantially cylindrical. Preferably, it has an axis of symmetry A, which, in use, corresponds to the direction of flow of the operating fluid within the conduit.

The main body 2 is made in two parts, or nuts, mutually coupled, and in particular a first cover part, denoted by 21, and a second bottom part, denoted by 22.

The cover portion 21 has a flared outer profile 23, in particular substantially conical, substantially convex or arrowhead, for a better aerodynamic coupling with in the flow of the operating fluid.

The cover portion 21 and the bottom portion 22 each have a seat, respectively 24 and 25, suitable for receiving a means of mutual coupling or connection, denoted by 3.

In the present example, each seat 24, 25 is a through hole disposed in a position substantially centered on the respective part 21, 22. The seat 25 is equipped with nut thread. Correspondingly, in the present example the connection means is a pin equipped with a threaded end suitable to engage the above mentioned nut thread of the seat 25.

The device 1 also comprises a plurality of locking arms of the device itself, and then of the filter integral with it, within the conduit. The arms branch off from the main body 2. In the present example, three arms are provided, respectively denoted by references 4, 5 and 6, which, in use, branching off radially from the main body 2.

Each arm 4-6 presents oblong shape and is associated to the main body 2 at its own first longitudinal end, denoted by way of example with 41 for the first arm 4.

In particular, in use the first end 41 is received between the two parts 21 and 22 of the main body 2 according to an arrangement which will be described below. At a second longitudinal end opposite to the first, denoted always by way of example with 42 for the first arm 4, each arm 4-6 is apt to abut on the wall of the conduit. To this end, at said second end 42 each arm 4-6 presents a sloped engagement profile, always denoted by 43 for the first arm 4.

Figure 3:
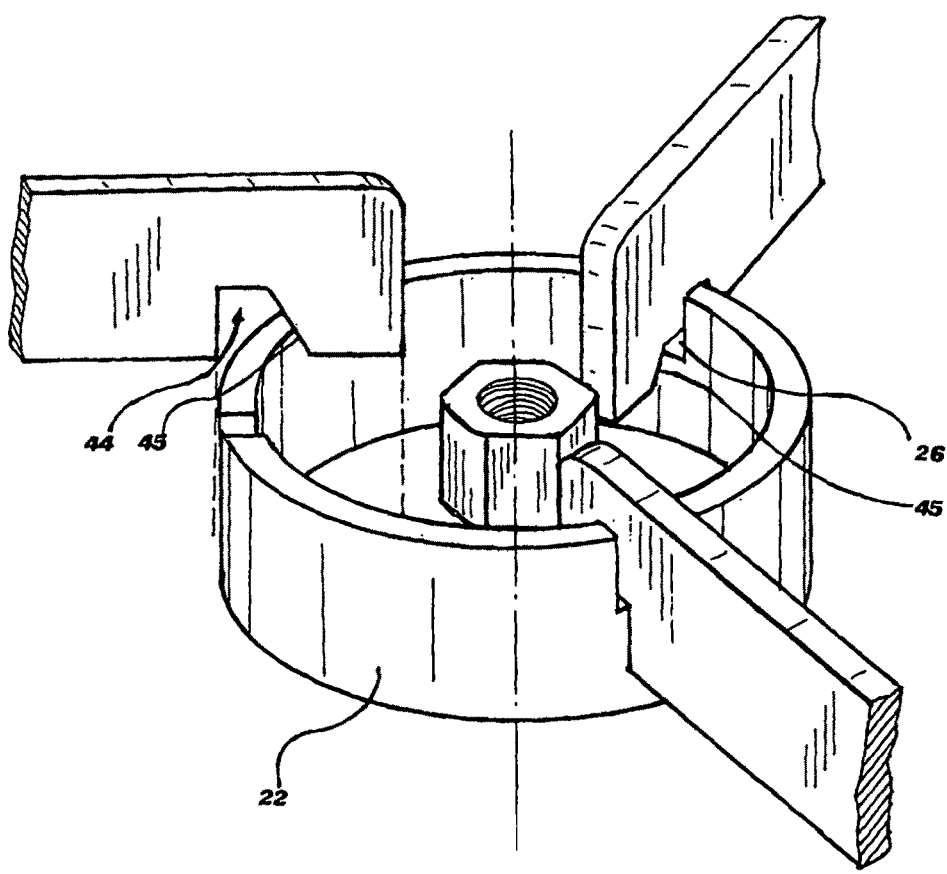
FIG. 3 shows a perspective view of an enlarged detail of the device of FIG. 1, in a partially assembled condition.
Figure 3A:
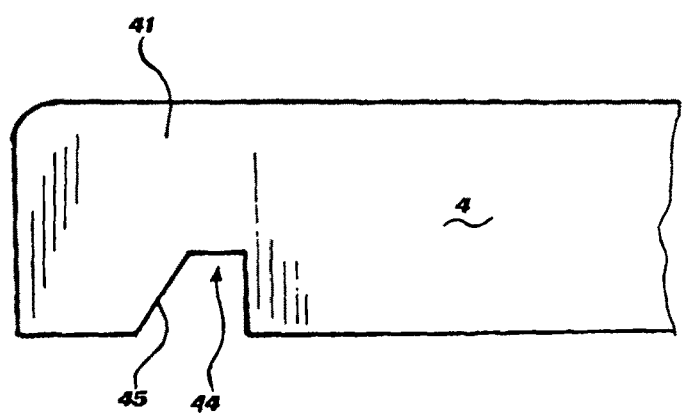
FIG. 3A shows a side view of an arm of the device of FIG. 3.

The association or coupling mode of each arm 4-6 to the main body 2 are described below taking as an example the first arm 4 and also with reference to FIGS. 3 and 3A. It is understood that the same description also applies to each of the other arms 5 and 6.

On the side of the bottom part 22 that mates with the cover part 21 is provided a seat 26 in the form of indentation apt to receive in engagement the first end 41 of the first arm 4. Correspondingly, as seen better in FIG. 3A, on this first end 41 an engagement profile 44 is formed suitable to mate with the seat 26 and laying down a sloped profile 45.

Further, as seen better in FIG. 1A, on the side of the cover part 21 that mates with the bottom portion 22 is preferably formed a groove 27, or another engagement element, apt to receive a corresponding side of the first arm 4.

The pin 3, passing through the hole 24 of the cover part 21 and screwed into the hole 25 of the bottom part 22 of the main body 2, tights the latter between them and the first ends (41) of the arms 4-6 between them until to complete blockage of the arms themselves. As the pin 3 is screwed into the hole 25, the cover part 21 approaches the bottom portion 22, simultaneously changing the tilt of the arms 4-6.

Figure 4A:
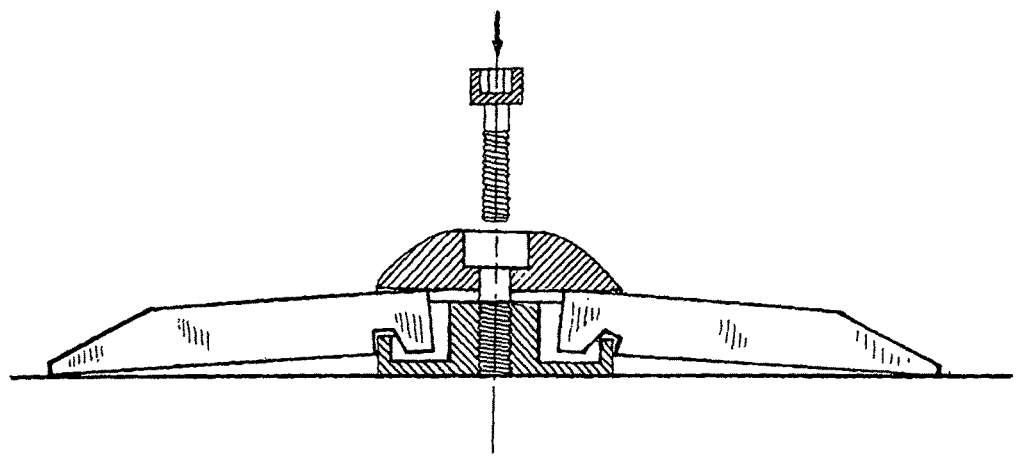
FIG. 4A shows a cross-sectional view of the device of FIG. 1 in a configuration of minimum encumbrance.

By virtue of this arrangement, the arms 4-6 are movable with respect to the main body 2 so as to assume a compact configuration, shown in FIG. 4A, in which the arms are not completely blocked on the main body 2 and then are tilted towards the bottom part 22 of this by virtue of the coupling of the sloped profile (43) of the first end (41) with the respective seat 26. In this configuration, the arms are still bound to the main body 2—that cannot be separated from— by virtue of the coupling of the complementary profiles of the seat 26 and the end (41).

Figure 4B:
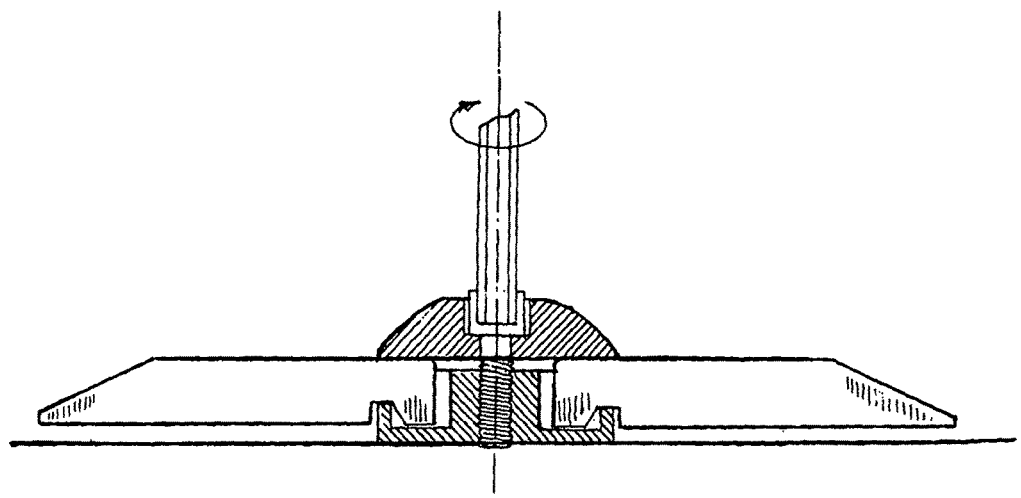
FIG. 4B shows a cross-sectional view of the device of FIG. 1 in a locking configuration.

As shown in FIG. 4B, as the tightening of the pin 3 progresses, the arms 4-6 tend to assume a configuration in which branch off radially according to a development substantially orthogonal to the axis A of the main body, until the above locking configuration. In this locking configuration, i.e. total stop, the arms 4-6 are blocked against a tube 100 and in particular an internal seat 104 of the latter, as shown in FIG. 5 and described below.

In the configuration of minimal encumbrance, or better in one of the configurations of minimal encumbrance in which the arms are tilted towards the bottom part 22, the insertion or removal of the device 1 in the conduit is allowed.

The device 1 thus allows a removable locking of the filter F in the conduit, simply screwing the pin 3.

The device 1 of the present example is suitable for locking a filter in a delivery conduit of operating fluid, in particular water, within the tube bundles of a heat exchanger, in particular an evaporator or a condenser. In FIGS. 5 and 5A, the device 1 is precisely shown in this application. In particular, the reference 200 denotes precisely the evaporator, 201 the support of the evaporator, 202 an entry nozzle of water in the evaporator/condenser 200 and 203 a discharge pipe water.

As shown in these figures, in the present example a cone filter F is made integral with the main body 2 at the outer wall of the bottom member 21. To this end, a so-called hat C closing of the filter is provided, fixed and/or centered at the bottom portion 21 by the same pin 3 and provided for this purpose a special threaded seat or only perforated. As shown in FIG. 5 is also provided an abutment ring A (fixed in the tubular element 100) of the filter F, in the opposite position to the device 1 and of the type known per se.

The locking device 1 is arranged inside an installation tubular element 100 that can be provided as a filter housing or as a separate element. Such tubular element 100 is fixed, on opposite sides, to the nozzle 202 and to the discharge pipe 203 and this by means of clamping elements 101 and 102, the latter for example of the type produced by Victaulic®.

The tubular element 100 has abutment means, in particular a recess 104 extending for the entire cross section of the element, apt to receive in abutment the ends 42 of the arms 4-6. At the opposite side, an analogous recess or equivalent abutment means for the ring "A" is provided.

The device of the invention can be provided in the form of a mounting kit for and/or jointly to the tubular installation element 100 mentioned above.

Variant embodiments may provide stop or locking means of the arms in the retaining configuration within conduit other than those described above.

The present invention has been so far described by referring to preferred embodiments. It is to be meant that other embodiments belonging to the same inventive core may exist, as defined by the protection scope of the here below reported claims.

The invention claimed is:

1. A device for locking a filter in a conduit, in particular for use in a heat exchanger, the device comprising:
   a main body made of two parts and adapted to be associated with the filter; and
   a plurality of locking arms, which, in use, branch off from said main body and have each a first longitudinal end coupled with said main body and a second longitudinal end adapted to abut on the conduit for locking the filter, wherein said locking arms are movable with respect to said main body so as to assume a first minimal encumbrance configuration, in which insertion of the device in the conduit is allowed, and a second locking configuration, in which said two parts are mutually tightened, the one on the other, and hold therebetween each first longitudinal end and in which each second longitudinal end abuts on the walls of the conduit, the device allowing a removable locking of the filter in the conduit.

2. The device according to claim 1, wherein said main body is adapted to be arranged, in use, in a centered position with respect to the cross section of the conduit and has an axis which is arranged, in use, substantially parallel to the direction of flow in the conduit.

3. The device according to claim 1, wherein said main body has a substantially circular geometry.

4. The device according to claim 1, comprising means for tightening said first ends of said arms in said main body.

5. The device according to claim 4, wherein said means for tightening comprises one or more threaded couplings.

6. The device according to claim 1, comprising means for stopping said arms, adapted to lock the latter in said locking configuration.

7. The device according to claim 6, wherein said means for stopping said arms comprises a pin.

8. The device according to claim 1, comprising a mutual engagement system of said arms and said main body, which mutual engagement system preferably comprises, for each arm, a seat obtained in said main body and an engagement portion of said seat obtained on said arm.

9. The device according to claim 8, wherein said mutual engagement system comprises respective conjugated profiles of said main body and of each arm, preferably the form of an indent of said main body and a respective sloped profile of said arm.

10. The device according to claim 1, wherein, in said minimal encumbrance and locking configurations, said arms have a different tilt with respect to said main body.

11. The device according to claim 1, wherein said locking arms are arranged, in use, substantially radial with respect to said main body.

12. The device according to claim 1, comprising three locking arms.

13. The device according to claim 1, which is provided in form of a kit.

14. An assembly, comprising:
the device for locking a filter according to claim 1; and
a filter associated or associable with the locking device and/or a tubular member for installing.

15. A heat exchanger, comprising:
the device for locking a filter according to claim 1.

16. A heat exchanger, comprising:
the assembly according to claim 14.

* * * * *